(12) United States Patent
Watanabe et al.

(10) Patent No.: US 6,816,049 B2
(45) Date of Patent: Nov. 9, 2004

(54) ACTUATOR

(75) Inventors: Yoichi Watanabe, Kanagawa (JP); Kazuyuki Tsukamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/384,579

(22) Filed: Mar. 11, 2003

(65) Prior Publication Data

US 2004/0056745 A1 Mar. 25, 2004

(30) Foreign Application Priority Data

Sep. 19, 2002 (JP) .......................................... 2002-273692

(51) Int. Cl.⁷ .............................................. H01F 7/08
(52) U.S. Cl. ................................... 335/222; 340/407.2
(58) Field of Search .............................. 335/222, 205, 335/206, 207, 229–234; 340/407.1, 407.2; 360/105, 106; 369/215

(56) References Cited

U.S. PATENT DOCUMENTS 5,121,091 A * 6/1992 Fujiyama ........................ 335/1
5,486,965 A * 1/1996 Yoshida et al. ............. 360/265
5,621,591 A * 4/1997 Rahimi et al. .............. 360/265

FOREIGN PATENT DOCUMENTS

JP   A 2000-330688   11/2000

* cited by examiner

*Primary Examiner*—Ramon M. Barrera
(74) *Attorney, Agent, or Firm*—Oliff & Berridge, PLC

(57) ABSTRACT

An actuator has a first yoke plate, a second yoke plate, magnets, coils, a haptic feel providing member, and a coil fixing member. The first yoke plate and the second yoke plate each assume a plate-like shape having a generally square outline, and are provided approximately parallel with each other. The magnets are fixed to that surface of the first yoke plate which is opposed to the second yoke plate. The coils are provided movably between the magnets and the second yoke and are fixed to the coil fixing member so as to form a unitary body together. Electromagnetic forces that are generated in magnetic fields of the magnets act on the coils, whereby the haptic feel providing member that is supported by the coil fixing member is moved.

16 Claims, 12 Drawing Sheets

ACTUATOR

The present disclosure relates to the subject matter contained in Japanese Patent Application No. 2002-273692 filed Sep. 19, 2002, which is incorporated herein by reference in its entirety.

BACKGROUND OF THE INVENTION

1. Field of the Invention

The present invention relates to an actuator having coils and magnets.

2. Description of the Related Art

In general, actuators are such that a second member is moved relative to a first member. With this movement, it is possible to move a sample or the like that is fixed to the second member or to give a haptic feel to a person's fingertip that touches the second member. Various driving mechanisms have been proposed for such actuators.

Among those actuators, actuators having coils and magnets utilize the phenomenon that when a current flows through a coil existing in a magnetic field around a magnet, an electromagnetic force acts on the coil. A second member to which a coil is fixed is moved relative to a first member to which a magnet is fixed. These actuators are worth paying attention to particularly in that the second member can move two-dimensionally in a plane.

An information receiving and feel providing device disclosed in JP-A-2000-330688 is known as a device using such an actuator. This device has a configuration that a flat, two-dimensional actuator is mounted on a mouse, and provides haptic feel information in link with a picture on a personal computer. The actuator is configured in such a manner that magnets are fixed on a base, a coil holder that holds coils is placed over the magnets, and the four sides of the coil holder are supported by elastic members from outside.

Where an actuator as described above is used being incorporated in a small device such as a mouse, size increase of the mouse causes deterioration in its operability. To prevent the size increase of the mouse, it is necessary to reduce the size of the actuator so that it can be incorporated inside an ordinary mouse.

On the other hand, where a haptic feel is to be provided by using an actuator that is incorporated in a mouse, the haptic feel providing ability can be increased by increasing the thrust on the second member. For example, the thrust on the second member can be increased by increasing the strength of magnetic fields to be exerted on the coils by increasing the dimensions of the magnets. However, increasing the dimensions of the magnets causes size increase of the actuator, which is not favorable.

SUMMARY OF THE INVENTION

The present invention has been made to solve the above problem, and an object of the invention is to provide an actuator that can increase thrusts and can be reduced in size.

To attain the above object, an actuator according to the invention comprises a generally flat-plate-like first yoke plate; a generally flat-plate-like second yoke plate provided approximately parallel with the first yoke plate; a plurality of magnets fixed to a surface of the first yoke plate that is opposed to the second yoke plate; a plurality of coils provided parallel with a surface of the second yoke plate that is opposed to the first yoke plate; and a coil fixing member to which the coils are fixed to form a unitary body together.

Since the second yoke plate is provided approximately parallel with the first yoke plate, magnetic fluxes extending from the magnets on the first yoke plate are attracted by the second yoke plate. Therefore, the ratios of the Z component (i.e., the component in the direction in which a magnetic flux located close to the center of the pole surface of a magnet extends) of a magnetic flux to its X and Y components (i.e., the components parallel with the XY-plane) are small. As a result, the ratio of the Z component of an electromagnetic force acting on the wire of each coil to its X or Y component is small. That is, the magnetic fluxes efficiently act on the coils to be moved in the X and Y direction. As a result, the thrusts per unit magnetic flux, that is, the thrusts per unit magnet area, are increased. Therefore, the thrusts on the coils and the coil fixing member can be increased and the actuator can be miniaturized.

Since the ratio of the Z component of an electromagnetic force acting on the wire of each coil to its X or Y component is small, the inclination of the coils and the coil fixing member is suppressed. Further, the resistance between the coils and the coil fixing member and other members is reduced, whereby the coils and the coil fixing member can be moved stably.

Since the first yoke plate and the second yoke plate are provided, magnetic fluxes extending from the magnets are attracted by or go through the yoke plates. This makes it possible to suppress leakage of a magnetic flux outside the actuator.

The actuator may be such that the interval $d_1$ between the magnets and the coils is longer than the interval $d_2$ between the second yoke plate and the coils. Where the relationship $d_1 > d_2$ is established between the intervals $d_1$ and $d_2$, in the vicinity of the edge of a certain magnet, although the magnetic flux extending direction deviates from the Z direction, the ratios of the X and Y components of the magnetic flux to its Z component are small at the position of the part of the wire of a corresponding coil because that part of the wire is distant from the magnet concerned in the Z direction. As a result, the ratio of the Z component of an electromagnetic force acting on that part of the wire of the coil to its X or Y component is small, and hence the inclination of the coils and the coil fixing member can be suppressed even if the coils and the coil fixing member are moved relative to the first yoke plate in a wide range in the XY-plane. The resistance between the coils and the coil fixing member and other members is lowered, whereby the coils and the coil fixing member are allowed to move stably.

Alternatively, the actuator may be such that the interval $d_1$ between the magnets and the coils is shorter than or equal to the interval $d_2$ between the second yoke plate and the coils. Magnetic flux densities near the respective magnets increases as the interval between the magnets and the coils and the coil fixing member decreases. Therefore, establishing the relationship $d_1 \leq d_2$ between the intervals $d_1$ and $d_2$ makes it possible to further increase the thrusts on the coils and the coil fixing member.

The actuator may further comprise a magnetic member provided adjacent to the boundary of each adjoining pair of magnets among the plurality of magnets. In this case, in the vicinity of the edge of a certain magnet, although the magnetic flux extending direction deviates from the Z direction, a large part of a magnetic flux close to the joining portion of the two adjoining magnets goes through the magnetic member existing there. As a result, in the space between the magnets and the coils, the ratios of the X and Y components of the magnetic flux to its Z component are small and the ratio of the Z component of an electromagnetic force acting on part of the wire of a corresponding coil to its X or Y component is small. Therefore, the inclination of the coils and the coil fixing member can be suppressed even if the coils and the coil fixing member are moved relative to the first yoke plate in a wide range in the XY-plane. The frictional resistance between the coils and the coil fixing member and other members is reduced, whereby the coils and the coil fixing member can be moved stably.

The actuator may be such that one or both of the first yoke plate and the second yoke plate are formed with an opening, and that the coil fixing member has a pillar portion that is provided in a region facing the opening so as to penetrate through the opening and whose external size is larger than the internal size of the opening. Since this structure restricts the movable range of the coils and the coil fixing member, it is not necessary to provide separate members for restricting the movable range of the coils and the coil fixing member and hence the actuator can be miniaturized.

The actuator may be such that the second yoke plate is formed with the opening. This makes it unnecessary to form an opening in the first yoke plate. Since the sizes of the magnets provided on the first yoke plate can be kept unchanged, the formation of the opening does not influence the thrusts on the coils and the coil fixing member.

The actuator may further comprise a buffer member that is provided at the edge of the opening to contact the pillar portion or a portion of the pillar portion to contact the edge of the opening. This makes it possible to reduce impact that may occur when the pillar portion contacts the edge of the opening.

The actuator may be such that the coil fixing member has a pillar portion provided on one or both of the side facing the first yoke plate and the side facing the second yoke plate, and that the actuator further comprises a surrounding member whose outer size is larger than the outer size of the pillar portion and that is provided so as to surround the pillar portion. Since the surrounding member restricts the movable range of the coils and the coil fixing member, it is not necessary to provide separate members for restricting the movable range of the coils and the coil fixing member and hence the actuator can be miniaturized.

The actuator may be such that one or both of the first yoke plate and the second yoke plate are formed with an opening, and that the surrounding member is provided adjacent to the opening. Since the surrounding member can surround the pillar portion properly, the movable range of the coils and the coil fixing member can be restricted and the actuator can be minimized.

The actuator may further comprise a buffer member that is provided at a portion of the surrounding member to contact the pillar portion or a portion of the pillar portion to contact the surrounding member. This makes it possible to reduce impact that may occur when the pillar portion contacts the surrounding member.

The actuator may further comprise a restricting member provided in a fixed manner between the first yoke plate and the second yoke plate, for restricting the movable range of the coil fixing member. Since the restricting member restricts the movable range of the coils and the coil fixing member, it is not necessary to provide separate members for restricting the movable range of the coils and the coil fixing member and hence the actuator can be miniaturized.

The actuator may further comprise a buffer member that is provided at a portion of the restricting member to contact the coil fixing member or at a portion of the coil fixing member to contact the restricting member. This makes it possible to reduce impact that may occur when the coil fixing member contacts the restricting member.

The actuator may be such that one or both of the first yoke plate and the second yoke plate are formed with an opening, that the coil fixing member has a pillar portion that is provided in a region facing the opening so as to penetrate through the opening and whose external size is larger than the internal size of the opening, and that the actuator further comprises a haptic feel providing member that is fixed to the pillar portion so as to be located on the side of the opening opposite to the coil fixing member. This makes it possible to provide haptic information to a fingertip or the like that touches the haptic feel providing member.

The actuator may further comprise position detecting means for detecting a position of the coil fixing member relative to one of the first yoke plate and the second yoke plate. In the actuator having such position detecting means, a position of the coil fixing member relative to the first or second yoke plate. This makes it possible to control the movement of the coil fixing member by controlling the currents to flow through the coils on the basis of the detected relative position.

DETAILED DESCRIPTION OF THE PREFERRED EMBODIMENTS

Figure 1:
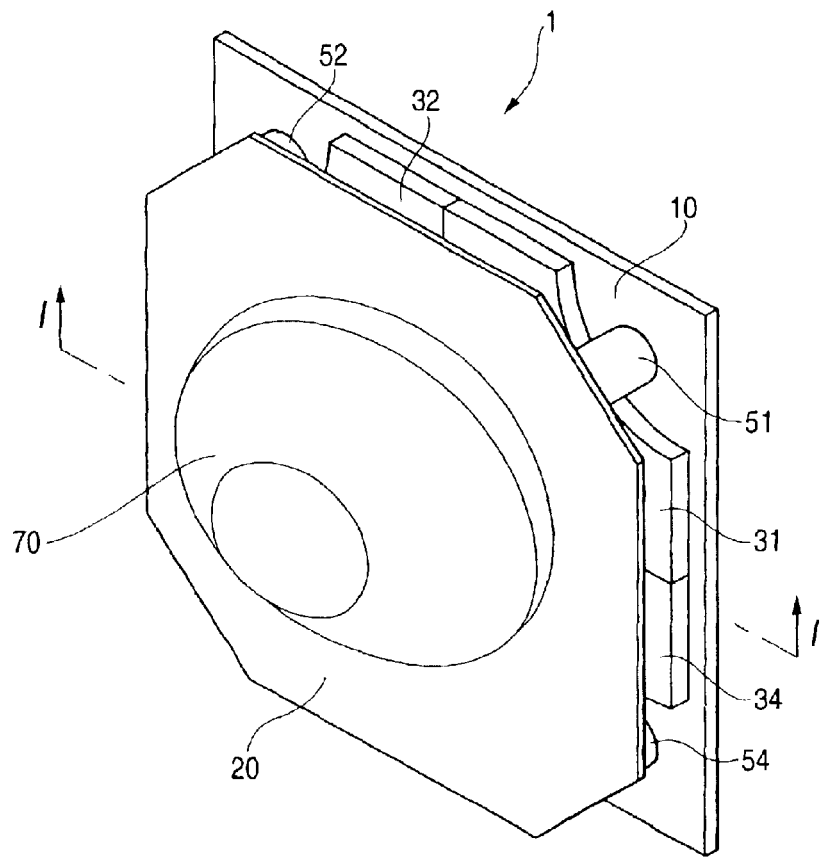
FIG. 1 is a perspective view of the entire actuator according to a first embodiment.

Embodiments of the present invention will be hereinafter described in detail with reference to the accompanying drawings. The same components are given the same symbol in the drawings and redundant descriptions may be omitted.
(First Embodiment)

Figure 2:
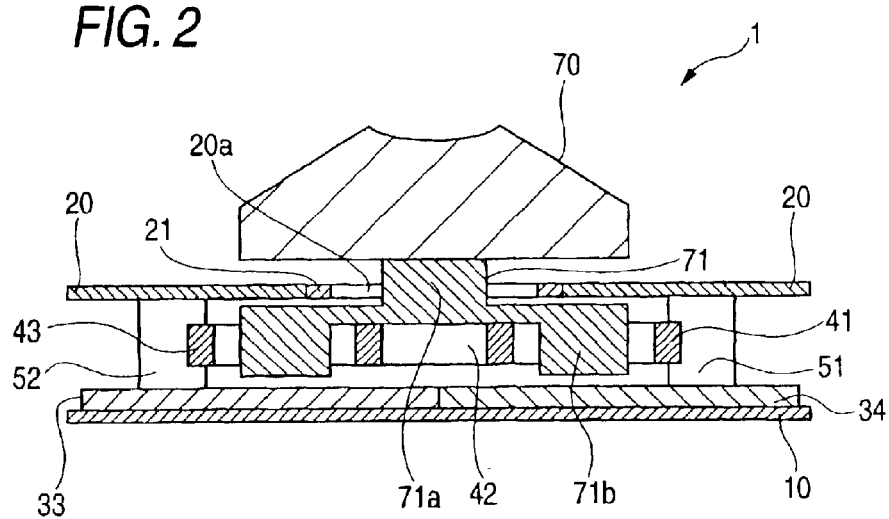
FIG. 2 is a side sectional view of the actuator taken along line I—I in FIG. 1.
Figure 3:
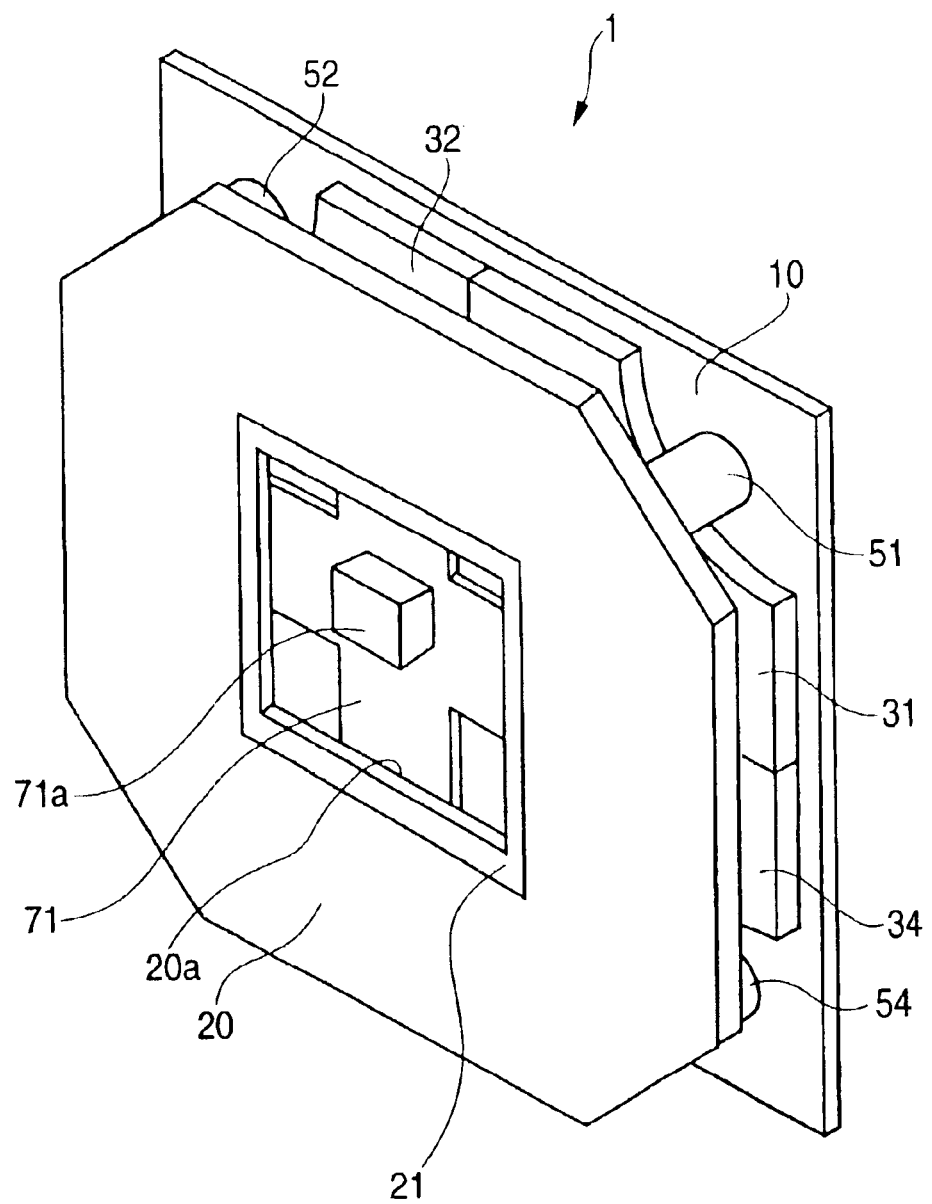
FIG. 3 is a perspective view of the actuator of FIG. 1 excluding a haptic feel providing member.
Figure 4:
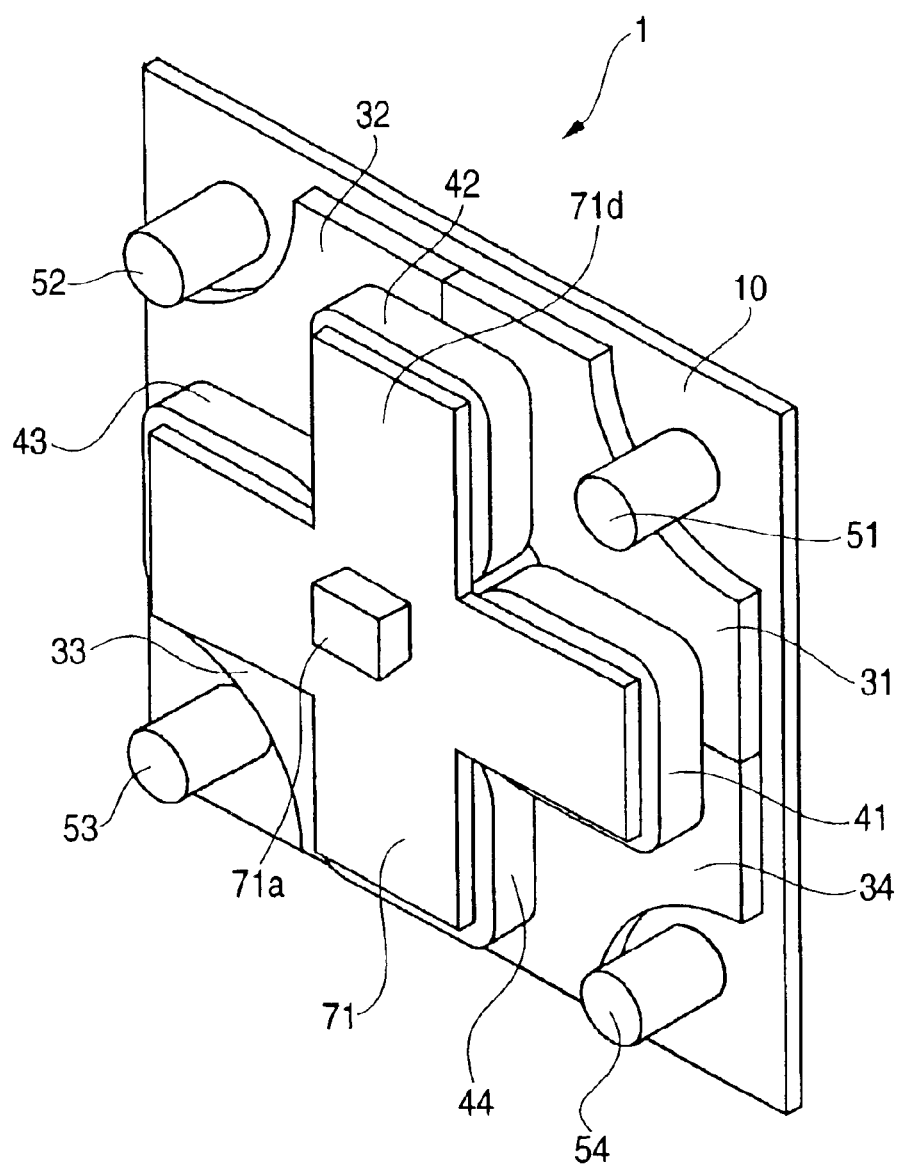
FIG. 4 is a perspective view of the actuator of FIG. 1 excluding the haptic feel providing member and a second yoke plate.
Figure 5:
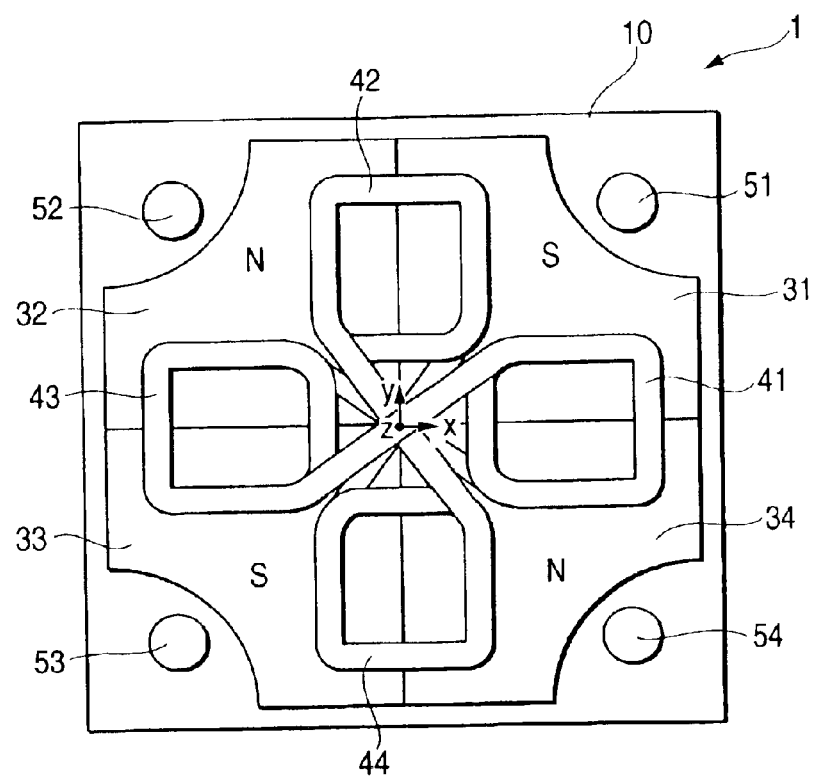
FIG. 5 is a plan view showing a positional relationship among coils and magnets in the actuator according to the first embodiment.
Figure 6:
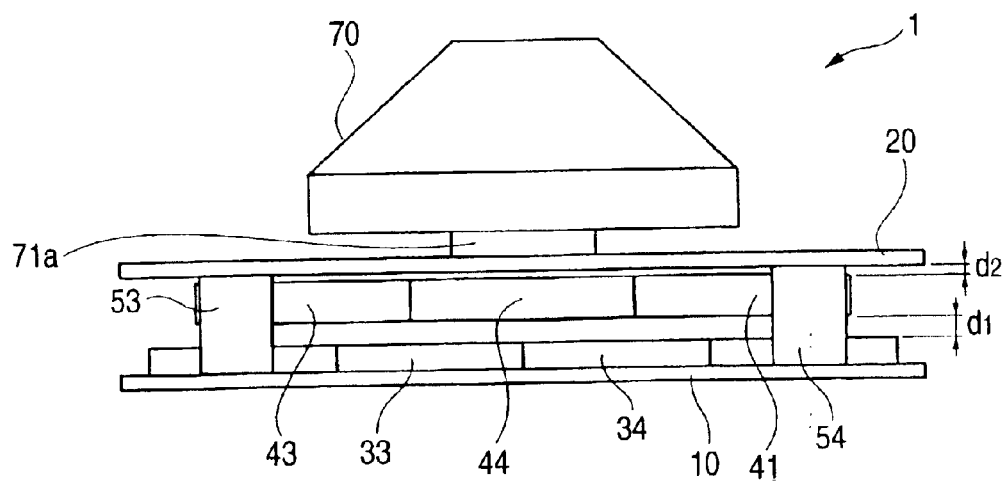
FIG. 6 is a side view of the actuator of FIG. 1.

An actuator according to a first embodiment of the invention will be described. FIGS. 1–6 show the configuration of an actuator 1 according to the first embodiment. FIG. 1 is a perspective view of the entire actuator 1. FIG. 2 is a side sectional view of the actuator 1 taken along line I—I in FIG. 1. FIG. 3 is a perspective view of the actuator 1 excluding a haptic feel providing member 70. FIG. 4 is a perspective view of the actuator 1 excluding the haptic feel providing member 70 and a second yoke plate 20. FIG. 5 is a plan view showing a positional relationship among coils 41–44 and magnets 31–34. FIG. 6 is a side view of the actuator 1.

As shown in FIGS. 1 and 2, the actuator 1 has a first yoke plate 10 and the second yoke plate 20 which are made of a magnetic material. The first yoke plate 10 is a generally square, flat plate. The second yoke plate 20 has a shape that four corner portions of a generally square flat plate are cut out obliquely. Cutting out the four corner portions of the second yoke plate 20 is to prevent interference at the time of attachment. The first yoke plate 10 and the second yoke plate 20 are approximately parallel with each other and fixed to each other at four corner positions by four studs 51–54. As shown in FIG. 3, the second yoke plate 20 has a rectangular opening 20a approximately at the center. The inner surfaces of the opening 20a is provided with a buffer member 21 which is made of a material capable of buffering impact.

The actuator 1 also has the haptic feel providing device 70 and a coil fixing member 71. The coil fixing member 71 is provided between the first yoke plate 10 and the second yoke plate 20 so as to be able to move parallel with the yoke plates 10 and 20. The coil fixing member 71 has a plate portion that is approximately parallel with the first yoke plate 10 and the second yoke plate 20 and extends in two orthogonal directions. The coil fixing member 71 also has a quadratic-prism-shaped pillar portion 71a that projects from the plate portion approximately at the center and penetrates through the opening 20a of the second yoke plate 20. The haptic feel providing member 70 is fixed to the tip of the pillar portion 71a so as to be able to move together with the coil fixing member 71, and faces a surface of the second yoke plate 20 which is located on the opposite side to the first yoke plate 10. The haptic feel providing member 70 has a disc shape having a central thick portion.

As shown in FIG. 4, the actuator 1 has the four coils 41–44. The coils 41–44 are fixed to coil holder portions 71b of the coil fixing member 71 to form a unitary body so as to be approximately parallel with a surface of the second yoke plate 20 which is opposed to the first yoke plate 10. Referring to FIG. 2, the coil holder portions 71b extend from the four ends of the plate portion of the coil fixing member 71 toward the first yoke plate 10 and penetrate through the cavities of the respective coils 41–44. And the coils 41–44 are fixed to the respective coil holder portions 71b. If the first yoke plate 10 is called a first member, the coils 41–44 and the coil fixing member 71 function as a second member capable of moving relative to the first member.

Referring to FIG. 4, the actuator 1 also has the four magnets 31–34 that are fixed to the surface of the first yoke plate 10 which is opposed to the second yoke plate 20.

FIG. 5 shows a relative positional relationship among the four magnets 31–34 and the four coils 41–44. Now assume an XYZ orthogonal coordinate system in which the center of the first yoke plate 10 is employed as the origin. Each of the X-axis and the Y-axis are parallel with the corresponding sides of the first yoke plate 10.

The four magnets 31–34 are fixed to the surface of the first yoke plate 10 which is opposed to the second yoke plate 20 in a region other than the regions where the studs 51–54 are provided. The four magnets 31–34 have the same plate-like shape and are arranged on the first yoke plate 10 so as to be symmetrical with respect to the Z-axis.

The magnet 31 is provided in the region in which both of the X-coordinate and the Y-coordinate are positive in such a manner that parts of its magnetic flux go through the coils 41 and 42. The magnet 32 is provided in the region in which the X-coordinate is negative and the Y-coordinate is positive in such a manner that parts of its magnetic flux go through the coils 42 and 43. The magnet 33 is provided in the region in which both of the X-coordinate and the Y-coordinate are negative in such a manner that parts of its magnetic flux go through the coils 43 and 44. The magnet 34 is provided in the region in which the X-coordinate is positive and the Y-coordinate is negative in such a manner that parts of its magnetic flux go through the coils 44 and 41. The magnets 31 and 33 are disposed in such a manner that their S-poles are opposed to the second yoke plate 20. The magnets 32 and 34 are disposed in such a manner that their N-poles are opposed to the second yoke plate 20.

The four coils 41–44 has the same shape and are fixed to the coil fixing member 71 in such a manner as to have the same distance from the second yoke plate 20 and be symmetrical with respect to the Z-axis. The coil 41 is provided in a region where the X-coordinate is positive so as to stride the X-axis. The coil 42 is provided in a region where the Y-coordinate is positive so as to stride the Y-axis. The coil 43 is provided in a region where the X-coordinate is negative so as to stride the X-axis. The coil 44 is provided in a region where the Y-coordinate is negative so as to stride the Y-axis. The coils 41 and 43 are connected to each other by a wire that goes by the origin so as to have opposite current flowing directions. The coils 42 and 44 are connected to each other by a wire that goes by the origin so as to have opposite current flowing directions.

The relative positional relationship among the magnets 31–34 and the coils 41–44 can also be stated in the following manner. The coil 41 is disposed so that forces that are generated in the magnetic field of the magnets 34 and 31 and act on currents flowing along the X direction are dominant. The coil 42 is disposed so that forces that are generated in the magnetic field of the magnets 31 and 32 and act on currents flowing along the Y direction are dominant. The coil 43 is disposed so that forces that are generated in the magnetic field of the magnets 32 and 33 and act on currents flowing along the X direction are dominant. The coil 44 is disposed so that forces that are generated in the magnetic field of the magnets 33 and 34 and act on currents flowing along the Y direction are dominant.

The wires of the coils 41–44 may be copper wires. For weight reduction, it is preferable to use copper-plated aluminum wires. It is preferable that the magnets 31–34 have a large coercive force and residual flux density. A preferable example is a NdFeB magnet.

Electromagnetic forces generated according to the left-hand rule in the magnetic fields of the magnets 31–34 act on the wires of the coils 41–44 in accordance with the magnitudes and directions of currents flowing through the coils 41–44, whereby the coils 41–44 receive thrusts. The coils 41–44 and the coil fixing member 71 are moved relative to the first yoke plate 10 to which the magnets 31–34 are fixed. As the coils 41–44 and the coil fixing member 71 move, a manipulator's finger, for example, that is in contact with the haptic feel providing member 70 which is fixed to the pillar portion 71a is given a haptic feel.

FIG. 6 is a side view of the actuator 1 as viewed from the Y direction. As seen from FIG. 6, one end of each of the studs 51–54 which are disposed at the four corner positions of the first yoke plate 10 is fixed to the first yoke plate 10 and the other end is fixed to the second yoke plate 20. The studs 51–54 thus serve to fix the first yoke plate 10 and the second yoke plate 20 to each other. In the actuator 1 according to this embodiment, the distance $d_1$ between the magnets 31–34 and the coils 41–44 is set longer than the distance $d_2$ between the second yoke plate 20 and the coils 41–44.

The actuator 1 according to this embodiment provides the following advantages. Since the second yoke plate 20 made of a magnetic material is disposed approximately parallel with the first yoke plate 10, magnetic fluxes extending from the magnets 31–34 which are provided on the first yoke plate 10 are attracted by the second yoke plate 20 so as to come closer to the Z direction. Therefore, the ratios of the X and Y components of each magnetic flux to its Z component decrease. As a result, the Z component of an electromagnetic force acting on each of the coils 41–44 is weaker than its X and Y components.

Figure 7A:
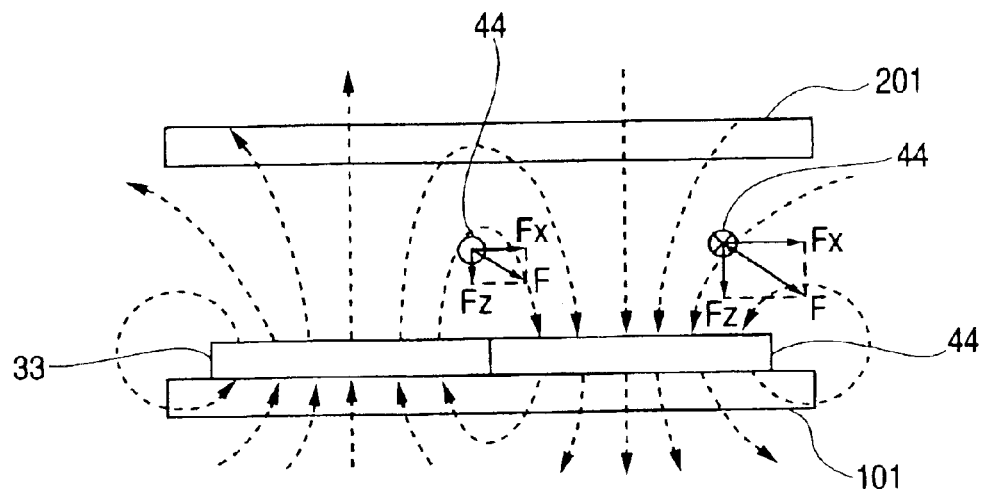
FIG. 7A is a schematic diagram illustrating magnetic fluxes generated inside a conventional actuator and FIG. 7B is a schematic diagram illustrating magnetic fluxes generated inside the actuator according to the first embodiment.
Figure 7B:
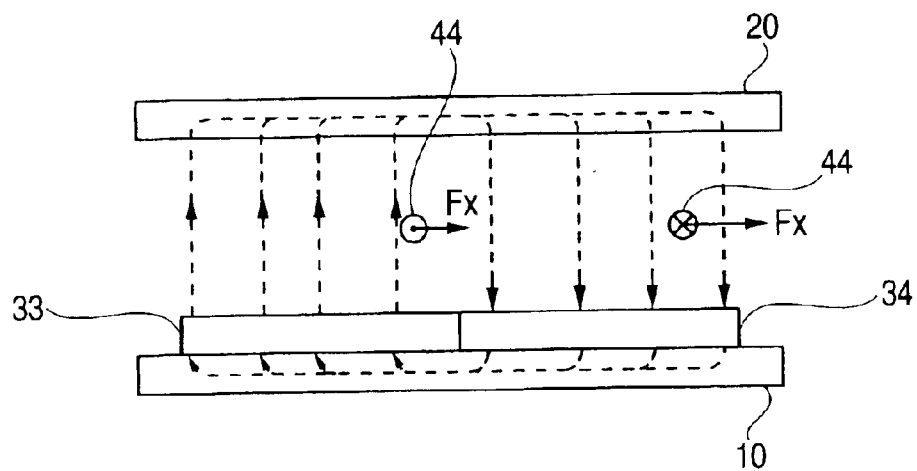

FIG. 7A is a schematic diagram illustrating magnetic fluxes generated inside a conventional actuator. FIG. 7B is a schematic diagram illustrating magnetic fluxes generated inside the actuator 1.

Referring to FIG. 7A, the conventional actuator has bases 101 and 201 and magnets 33 and 34 are fixed to the surface of the base 101. The magnet 33 is disposed in such a manner that its top surface is the S-pole, and the magnet 34 is disposed in such a manner that its top surface is the N-pole. Magnetic field lines (indicated by broken lines in FIG. 7A) extending from the top surface of the magnet 33 include lines that go toward the bottom surface of the magnet 33, parabolic lines that go toward the top surface of the magnet 34, and other lines. There are almost no magnetic field lines that are perpendicular to the top surfaces of the magnets 33 and 34. As a result, the Z component $F_Z$ of a thrust F acting on the coil 44 is stronger than its X component $F_X$. If the thrust F is constant, the absolute value of the X component $F_X$ decreases, that is, the thrust for moving the coil 44 in the X direction decreases, as that of the Z component $F_Z$ increases.

In contrast, referring to FIG. 7B, magnetic field lines extending from the top surface of the magnet 33 go approximately perpendicularly to the top surface of the magnet 33, go inside the second yoke plate 20, and go toward the top surface of the magnet 34 approximately perpendicularly to the top surface of the magnet 34. As a result, the X component $F_X$ of a thrust F acting on the coil 44 is dominant and the ratio of the Z component $F_Z$ (not shown) to the X component $F_X$ is small. The thrust in the Y direction can be explained in the same manner as in the X direction.

As described above, since the actuator 1 is provided with the second yoke plate 20 which is made of a magnetic material and disposed approximately parallel with the first yoke plate 10, magnetic fluxes efficiently act on the coils 41–44 which are movable in the X and Y directions, the thrusts per unit magnetic flux in the X and Y directions, that is, the thrusts per unit magnet area in the X and Y directions, are increased. Therefore, the thrusts on the coils and the coil fixing member can be increased without increasing the areas of the magnets. According to an analysis of the inventors, the presence of the second yoke plate 20 in the actuator increases the thrusts by a factor of 1.7. If the actuator has sufficient thrusts originally, the actuator can be miniaturized by decreasing the sizes of the magnets.

In the conventional actuator that is used in the information receiving and feel providing device of JP-A-2000-330688, the direction of an electromagnetic force acting on the wire of each coil depends on the direction of a magnetic flux generated by the magnets. That is, if the direction of a magnetic flux is parallel with a certain direction (assumed to be the Z direction) in the vicinity of the center of the pole surface of a magnet, the electromagnetic force acting on the wire of a coil existing there has only components in the XY-plane which is perpendicular to the Z-axis. On the other hand, at a position close to the edge of a magnet, the direction of a magnet flux is deviated from the Z direction and hence the electromagnetic force acting on the wire of a coil existing there has not only components in the XY-plane but also a component in the Z direction.

It is understood from the above discussion that, in the conventional actuator, although JP-A-2000-330688 states that the second member is moved two-dimensionally in a certain plane (XY-plane) relative to the first member, if part of the wire of a coil exists near the edge of a magnet the second member may be moved also in the Z direction by an electromagnetic force having a Z component. As a result, in the conventional actuator, the second member may incline or contact another member to cause resistance; the intended operation may not be performed stably. This problem is remarkable in the case where the second member is moved greatly to such an extent that part of the wire of a coil comes close to the edge of a magnet.

In contrast to the conventional actuator having the above problem, in the actuator 1 according to this embodiment the ratio of the Z component of an electromagnetic force acting on the wire of each of the coils 41–44 to its X or Y component is small. The Z component of an electromagnetic force acts on the wire of a certain one of the coils 41–44 so as to incline the coils 41–44 from the first yoke plate 10 and the second yoke plate 20. Decreasing the ratio of the Z component of an electromagnetic force to its X or Y component is effective in suppressing inclination of the coils 41–44 and the coil fixing member 71, which in turn suppresses the frictional resistance between the coils 41–44 and the coil fixing member 71 and other members such as the magnets 31–34 and the second yoke plate 20. As a result, the coils 41–44 and the coil fixing member 71 can be moved stably. This advantage is remarkable in the case where the coils 41–44 and the coil fixing member 71 are moved relative to the first yoke plate 10 in a wide range in the XY-plane.

Used as an interface of a personal computer, a mouse incorporating an actuator is frequently brought close to a magnetic card such as an ID card or a magnetic recording medium such as a flexible disk. Therefore, to prevent an event that a magnetic flux leaking from the magnets of the actuator destroys internal data of a magnetic card or a magnetic recording medium, it is necessary to minimize the magnetic flux leakage from the actuator.

The actuator 1 according to this embodiment is provided with the first yoke plate 10 and the second yoke plate 20 which are made of a magnetic material and the magnets 31–34 are interposed between them. Magnetic fluxes of the magnets 31–34 are attracted by and go through the first yoke plate 10 and the second yoke plate 20 (see FIG. 7B), whereby the magnetic flux leakage outside the actuator 1 can be suppressed. According to an analysis of the inventors, the use of the first yoke plate 10 and the second yoke plate 20 can reduce the magnetic flux leakage by a maximum of 90%.

In the actuator 1 according to this embodiment, the intervals $d_1$ and $d_2$ have the relationship $d_1 > d_2$. Where it is necessary to move the coils 41–44 and the coil fixing member 71 stably, it is preferable that this relationship be satisfied in the actuator 1. In this case, in the vicinity of the edge of a certain one of the magnets 31–34, although the magnetic flux extending direction deviates from the Z direction, the ratios of the X and Y components of the magnetic flux to its Z component are small at the position of the part of the wire of a corresponding one of the coils 41–44 because that part of the wire is distant from the magnet concerned in the Z direction. As a result, the ratio of the Z component of an electromagnetic force acting on part of the wire of each of the coils 41–44 to its X or Y component is small, and hence the inclination of the coils 41–44 and the coil fixing member 71 can be suppressed. This advantage is particularly remarkable in the case where the coils 41–44 and the coil fixing member 71 are moved relative to the first yoke plate 10 in a wide range in the XY-plane. The resistance between the coils 41–44 and the coil fixing member 71 and other members is lowered, whereby the coils 41–44 and the coil fixing member 71 are allowed to move stably.

On the other hand, where it is necessary to further increase the thrusts on the coils 41–44 and the coil fixing member 71, it is preferable that the intervals $d_1$ and $d_2$ have a relationship $d_1 \leq d_2$. Magnetic flux densities near the coils 41–44 increase as the coils 41–44 come closer to the magnets 31–34. This tendency is remarkable near the edges of the magnets 31–34. The thrusts on the coils 41–44 and the coil fixing member 71 can further be increased by establishing the relationship $d_1 \leq d_2$.

In the actuator 1 according to this embodiment, the second yoke plate 20 is formed with the opening 20a at the center and the pillar portion 71a of the coil fixing member 71 penetrates through the opening 20a. It is preferable that the actuator have such a structure. Since this structure restricts the movable range of the coils 41–44 and the coil fixing member 71, it is not necessary to provide separate members for restricting the movable range of the coils 41–44 and the coil fixing member 71 such as the elastic members for supporting the coil holder from outside as disclosed in JP-A-2000-330688. The actuator can be miniaturized accordingly. In this case, the maximum external size of the actuator 1 is the size of the coils 41–44 increased by the movable distance in each direction.

Figure 8:
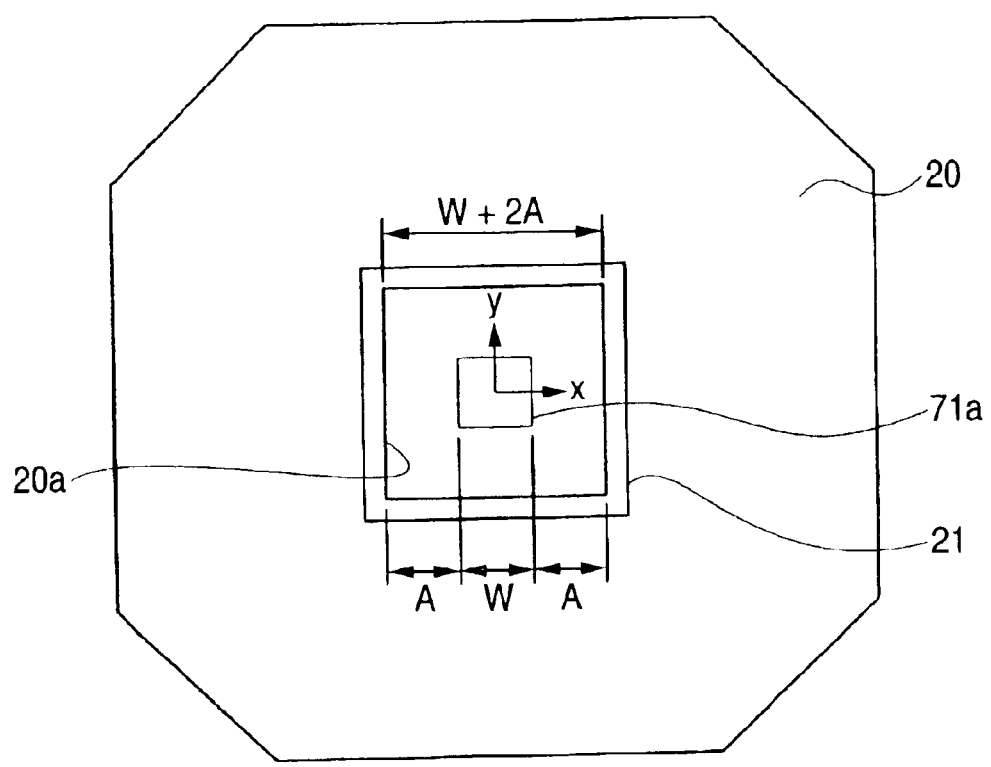
FIG. 8 is a schematic plan view showing an opening of the second yoke plate in the actuator according to the first embodiment.

FIG. 8 is a schematic plan view showing the opening 20a of the second yoke plate 20. In FIG. 8, the pillar portion 71a of the coil fixing member 71 is located approximately at the center of the opening 20a of the second yoke plate 20. Let W represent the width of the pillar portion 71a in each of the X and Y directions; then, the width of the opening 20a in the X direction is equal to W+2A if the movable range is set in such a manner that the pillar portion 71a is allowed to move by a distance A in each of the positive-X and negative-X directions. The same is true of the Y direction.

In this embodiment, the opening 20a is formed in the second yoke plate 20. This eliminates the need for forming an opening in the first yoke plate 10, whereby the sizes of the magnets 31–34 are not decreased. That is, the formation of the opening 20a does not affect the thrusts on the coils 41–44 and the coil fixing member 71.

It is preferable that the opening 20a be provided with the buffer member 21 as in the actuator 1 according to this embodiment. This makes it possible to reduce impact that may occur when the pillar portion 71a contacts an edge of the opening 20a, more specifically, an uncomfortable impact sound or an undue impact feel. The same advantage can also be obtained in a case that the pillar portion 71a itself is a buffer member.

(Second Embodiment)

Figure 9:
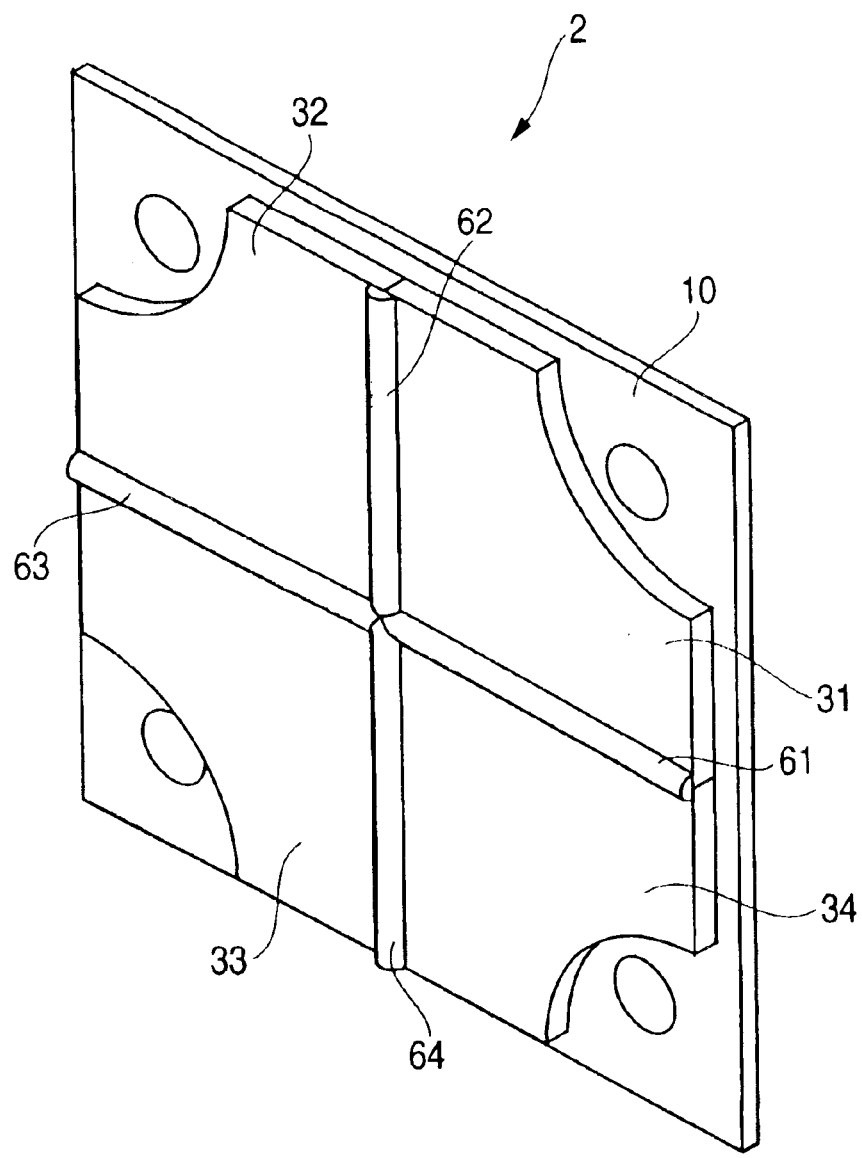
FIG. 9 is a perspective view of part of an actuator according to a second embodiment.
Figure 10:
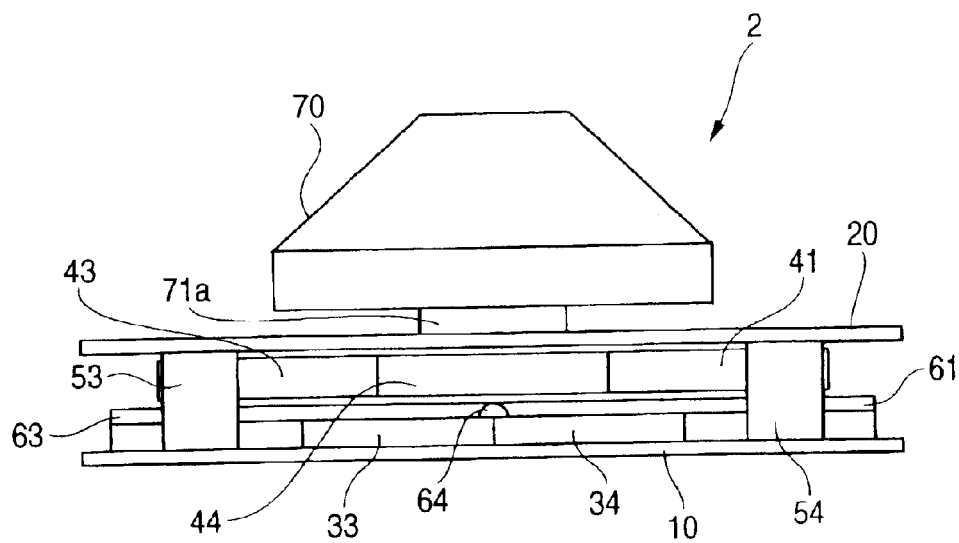
FIG. 10 is a side view of the actuator according to the second embodiment.

Next, an actuator according to a second embodiment of the invention will be described. FIGS. 9 and 10 show the configuration of an actuator 2 according to the second embodiment. More specifically, FIG. 9 is a perspective view of part of the actuator 2, and FIG. 10 is a side view of the actuator 2. Like the above-described actuator 1 according to the first embodiment, the actuator 2 according to the second embodiment is generally composed of a first yoke plate 10, a second yoke plate 20, four magnets 31–34, four coils 41–44, a coil fixing member 71, and four studs 51–54. These components have the same shapes as in the first embodiment.

FIG. 9 shows, in perspective, the first yoke plate 10, the four magnets 31–34, and four magnetic members 61–64 of the actuator 2 (the second yoke plate 20, the four coils 41–44, and the four studs 51–54 are removed). As shown in FIG. 9, the actuator 2 according to the second embodiment is different from the actuator 1 according to the first embodiment in that the former is further provided with the four magnetic members 61–64. An XYZ orthogonal coordinate system is also employed in this embodiment in the same manner as in the first embodiment.

The magnetic members 61–64 have the same rod shape having a half circle cross-section. The magnetic member 61 is fixed to the surfaces of the magnets 34 and 31 in such a manner that it extends along the boundary between the magnets 34 and 31 and its curved surface is opposed to the second yoke plate 20. The magnetic member 62 is fixed to the surfaces of the magnets 31 and 32 in such a manner that it extends along the boundary between the magnets 31 and 32 and its curved surface is opposed to the second yoke plate 20. The magnetic member 63 is fixed to the surfaces of the magnets 32 and 33 in such a manner that it extends along the boundary between the magnets 32 and 33 and its curved surface is opposed to the second yoke plate 20. The magnetic member 64 is fixed to the surfaces of the magnets 33 and 34 in such a manner that it extends along the boundary between the magnets 33 and 34 and its curved surface is opposed to the second yoke plate 20.

FIG. 10 is a side view of the actuator 2 as viewed from the Y direction. As shown in FIG. 10, each of the magnetic members 61–64 has a rod shape having a half circle cross-section, its flat surface is in contact with two of the magnets 31–34, and its curved surface is opposed to the second yoke plate 20. As shown in the drawing, it is preferable that that surface of each of the magnetic members 61–64 which is opposed to the second yoke plate 20 have no angled portions and be smooth. This prevents a magnetic flux from leaking from an angled portion in a concentrated manner.

In the actuator 2 according to the second embodiment, one of the magnetic members 61–64 is provided at the boundary between two adjoining ones of the four magnets 31–34. Therefore, in the vicinity of the edge of a certain one of the magnets 31–34, although the magnetic flux extending direction deviates from the Z direction, a large part of the magnetic flux of the two adjoining magnets goes through one of the magnetic members 31–34. As a result, in the space between the magnets 31–34 and the coils 41–44, the ratios of the X and Y components of a magnetic flux to its Z component are small and the ratio of the Z component of an electromagnetic force acting on part of the wire of each of the coils 41–44 to its X or Y component is small. Therefore, the inclination of the coils 41–44 and the coil fixing member 71 can be suppressed. The frictional resistance between the coils 41–44 and the coil fixing member 71 and other members is reduced, whereby the coils 41–44 and the coil fixing member 71 can be moved stably. This advantage is particularly remarkable in the case where the coils 41–44 and the coil fixing member 71 are moved relative to the first yoke plate 10 in a wide range in the XY-plane.

(Third Embodiment)

Figure 11:
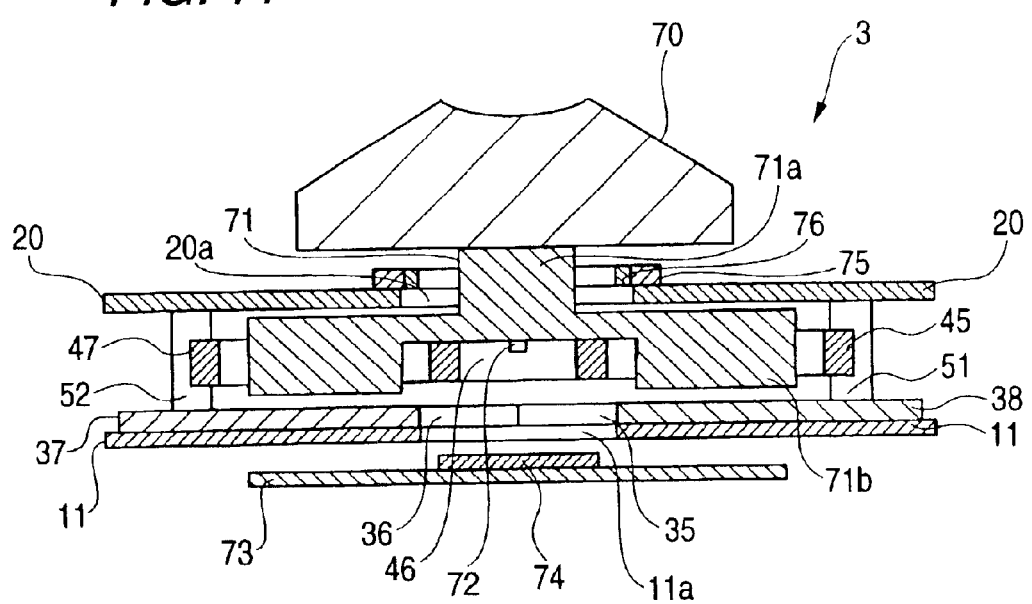
FIG. 11 is a side sectional view of an actuator according to a third embodiment taken along the same line I—I as shown in FIG. 1.
Figure 12:
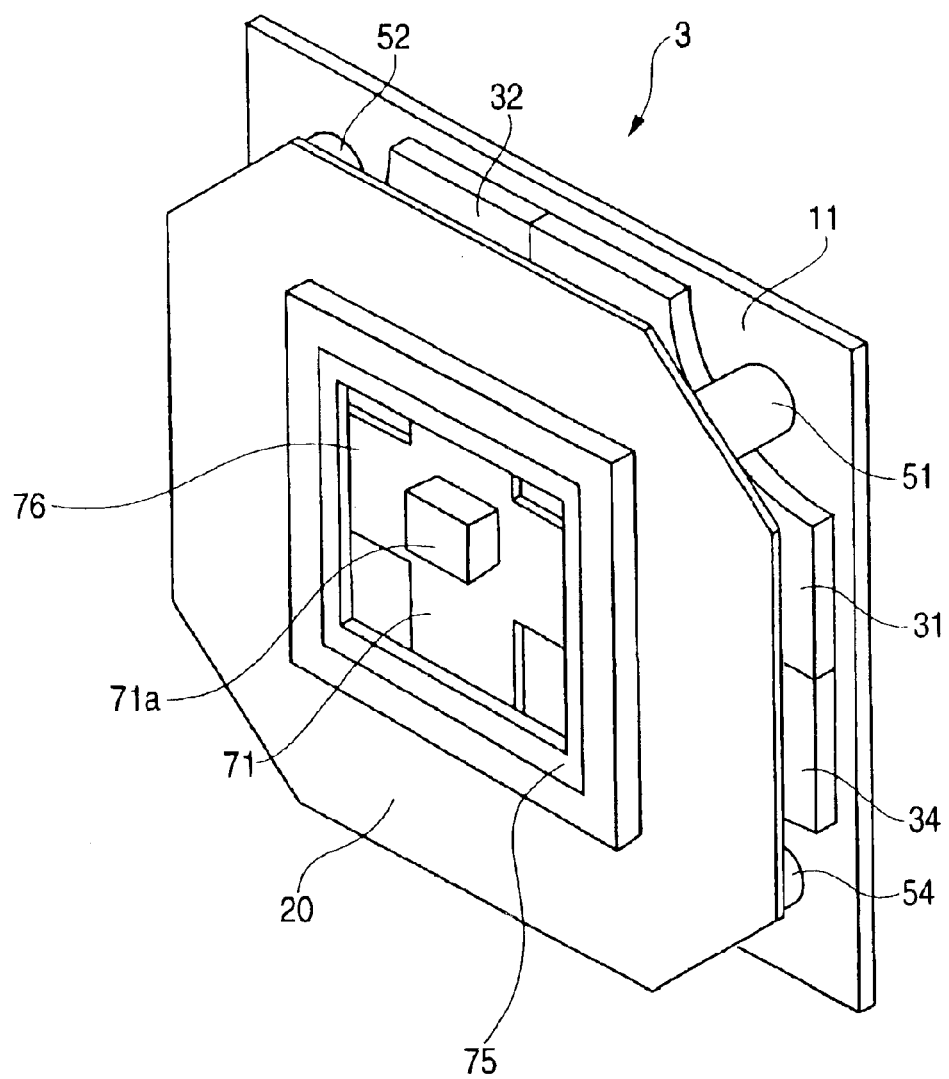
FIG. 12 is a perspective view of the actuator according to the third embodiment excluding a haptic feel providing member.
Figure 13:
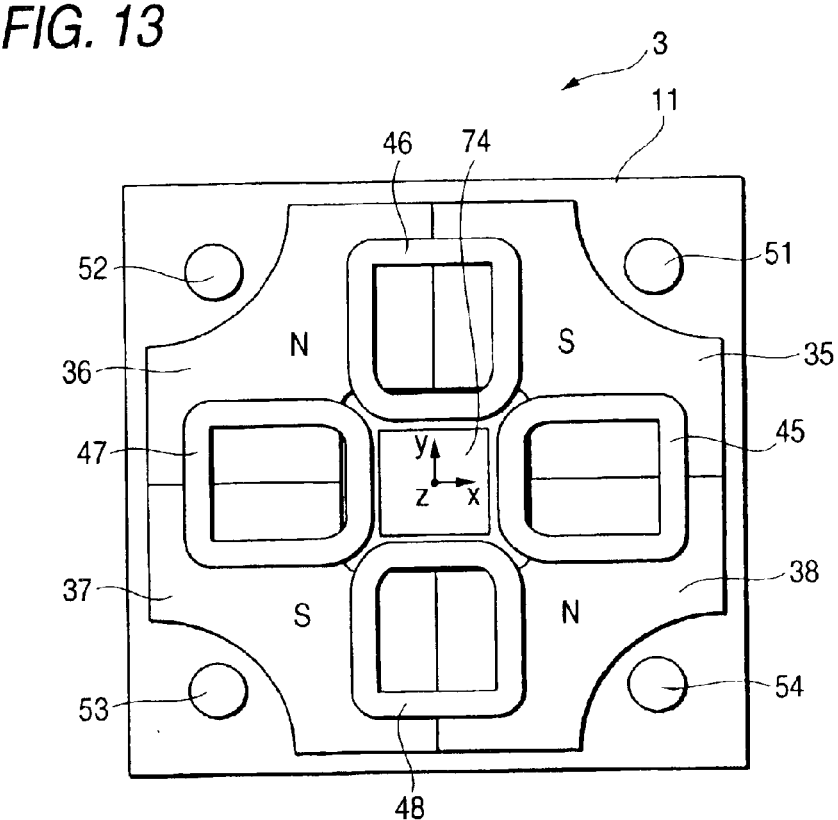
FIG. 13 is a plan view showing a positional relationship among coils and magnets in the actuator according to the third embodiment.

An actuator according to a third embodiment of the invention will be described below. FIGS. 11–13 show the configuration of an actuator 3 according to the third embodiment. The actuator 3 has the same appearance as the actuator 1 of FIG. 1. FIG. 11 is a side sectional view of the actuator 3 taken along the same line I—I as shown in FIG. 1. FIG. 12 is a perspective view of the actuator 3 excluding a haptic feel providing member 70. FIG. 13 is a plan view showing a positional relationship among coils 45–48 and magnets 35–38.

As shown in FIGS. 11 and 12, the actuator 3 is provided with a first yoke plate 11 and a second yoke plate 20. The first yoke plate 11 has a generally square, flat shape and has a generally rectangular opening 11a at the center. The shape of the second yoke plate 20 and the positional relationship between the first yoke plate 11 and the second yoke plate 20 are the same as in the first embodiment.

In this embodiment, as shown in FIG. 12, the opening 20a of the second yoke plate 20 is provided with a surrounding member 75. The surrounding member 75 has a generally square frame shape, and is provided on the second yoke plate 20 in such a manner that its inside region (i.e., the region inside the frame shape) is concentric with the opening 20a. The external size of the surrounding member 75 is larger than that of a pillar portion 71a of a coil fixing member 71, and the surrounding member 75 surrounds the pillar portion 71a. The internal size of the surrounding member 75 is smaller than the size of the opening 20a of the second yoke plate 20, and the external size of the surrounding member 75 is larger than the size of the opening 20a. A buffer member 76 made of a material capable of buffering impact is provided on the entire inner surfaces of the surrounding member 75.

The actuator 3 is also provided with the coil fixing member 71, which has the same structure as in the first embodiment.

The actuator 3 is provided with the four coils 45–48. Referring to FIG. 11, the coils 45–48 are fixed to coil holder portions 71b of the coil fixing member 71 to form a unitary body so as to be approximately parallel with that surface of the second yoke plate 20 which is opposed to the first yoke plate 11. The actuator 3 is also provided with the four magnets 35–38. The four magnets 35–38 are fixed to that surface of the first yoke plate 11 which is opposed to the second yoke plate 20.

The actuator 3 is provided with a substrate 73, a two-dimensional photodetector 74, and a light-emitting element 72. The light-emitting element 72 is attached to that end of the pillar portion 71a of the coil fixing member 71 which is opposite to its end to which the haptic feel providing member 70 is fixed so as to emit light in the negative-Z direction. Light that is emitted from the light-emitting element 72 passes through the opening 11a of the first yoke plate 11.

The two-dimensional photodetector 74 is a device for determining a light incident position on its light-receiving surface. Preferable examples of the two-dimensional photodetector 74 are a two-dimensional PSD (position-sensitive detector) and a two-dimensional photodiode array. The two-dimensional photodetector 74 is disposed at such a position as to be able to receive light that is emitted from the light-emitting element 72 and passes through the opening 11a. For example, the light-receiving surface of the two-dimensional photodetector 74 assumes a generally square shape as shown in FIG. 13. The substrate 73 is disposed approximately parallel with the first yoke plate 11 so as to be opposed to that surface of the first yoke plate 11 which is opposite to the surface to which the magnets 35–38 are fixed. The two-dimensional photodetector 74 is attached to the substrate 73 in a region that faces the opening 11a.

The light-emitting element 72 and the two-dimensional photodetector 74 function as a position detecting means for detecting a position of the coil fixing member 71 relative to the first yoke plate 11. This is done in the following manner. When the position of the coils 45–48 and the coil fixing member 71 has varied, the incident position of the light emitted from the light-emitting element 72 that is attached to the coil fixing member 71 also varies. The two-dimensional photodetector 74 detects a variation of the light incident position, whereby a position variation of the coils 45–48 and the coil fixing member 71 is detected. Optical components such as a lens may be interposed between the light-emitting element 72 and the photodetector 74.

FIG. 13 shows a relative positional relationship among the four magnets 35–38 and the four coils 45–48. The four magnets 35–38 are fixed to that surface of the first yoke plate 11 which is opposed to the second yoke plate 20 in a region other than the regions of the studs 51–54 and the opening 11a. The four magnets 35–38 have the same plate-like shape and are arranged on the first yoke plate 11 so as to be symmetrical with respect to the Z-axis.

The four coils 45–48, which have the same shape, are fixed to and arranged on the coil fixing member 71 so as to have the same distance from the second yoke plate 20 and to be symmetrical with respect to the Z-axis. This embodiment is different from the first embodiment in that the coils 45–48 are not connected to each other in the vicinity of the origin. The positional relationship between the coils 45–48 and the magnets 35–38 is the same as in the first embodiment and hence will not be described in detail.

It is possible to cause independent currents to flow through the respective coils 45–48. Electromagnetic forces generated according to the left-hand rule in the magnetic fields of the magnets 31–34 act on the wires of the coils 45–48 in accordance with the magnitudes and directions of currents flowing through the coils 45–48. As a result, the coils 45–48 and the coil fixing member 71 are moved relative to the first yoke plate 11. Haptic information is given to a manipulator's finger, for example, that is in contact with the haptic feel providing member 70 which is fixed to the pillar portion 71a. In this embodiment, in contrast to the case of the first embodiment, independent currents can be caused to flow through the respective coils 45–48 and hence a haptic feel of a complex movement such as rotation can be provided.

The actuator 3 according to this embodiment provides the following advantages. Since the second yoke plate 20 which is made of a magnetic material is provided approximately parallel with the first yoke plate 11, the thrusts can be increased without increasing the area of the magnets 35–38, which in turn makes it possible to actually increase the thrusts on the coils 45–48 and the coil fixing member 71 and to miniaturize the actuator. Since the inclination of the coils 45–48 and the coil fixing member 71 is suppressed, the frictional resistance between the coils 45–48 and the coil fixing member 71 and other members such as the magnets 35–38 and the second yoke plate 20 is lowered. As a result, the coils 45–48 and the coil fixing member 71 can be moved stably.

The actuator 3 according to this embodiment is provided with the first yoke plate 11 and the second yoke plate 20 which are made of a magnetic material, and the magnets 35–38 are interposed in between. This suppresses leakage of a magnetic flux outside the actuator 3.

The actuator 3 is provided with the surrounding member 75 that surrounds the pillar portion 71a. It is preferable that the actuator have such a surrounding member. Since the surrounding member 75 restricts the movable range of the coils 41–44 and the coil fixing member 71, the actuator can be miniaturized as in the case of the first embodiment. Providing the opening 20a with the surrounding member 75 makes it possible to surround the pillar portion 71a effectively, whereby the movable range of the coils 41–44 and the coil fixing member 71 can be restricted and the actuator can be miniaturized.

It is preferable to provide the buffer member 76 on the inner surfaces of the surrounding member 75, that is, those portions of the surrounding member 75 to which the pillar portion 71a will contact, as in the case of the actuator 3 according to this embodiment. This makes it possible to reduce impact at the time of contact. The same advantage can be obtained even if the surrounding member 75 itself is a buffer member.

It is preferable that the actuator 3 be provided with the position detecting means for detecting a position of the coil fixing member 71 relative to the first yoke plate 11 or the second yoke plate 20. In this embodiment, the position detecting means is composed of the light-emitting element 72 and the two-dimensional photodetector 74. Such a position detecting means makes it possible to detect a position of the coil fixing member 71 relative to the yoke plate 11 or 20. The movement of the coil fixing member 71, that is, the movement of the haptic feel providing member 70, can be controlled by controlling currents to flow through the respective coils 45–48 on the basis of the detected relative position.

(Fourth Embodiment)

Figure 14:
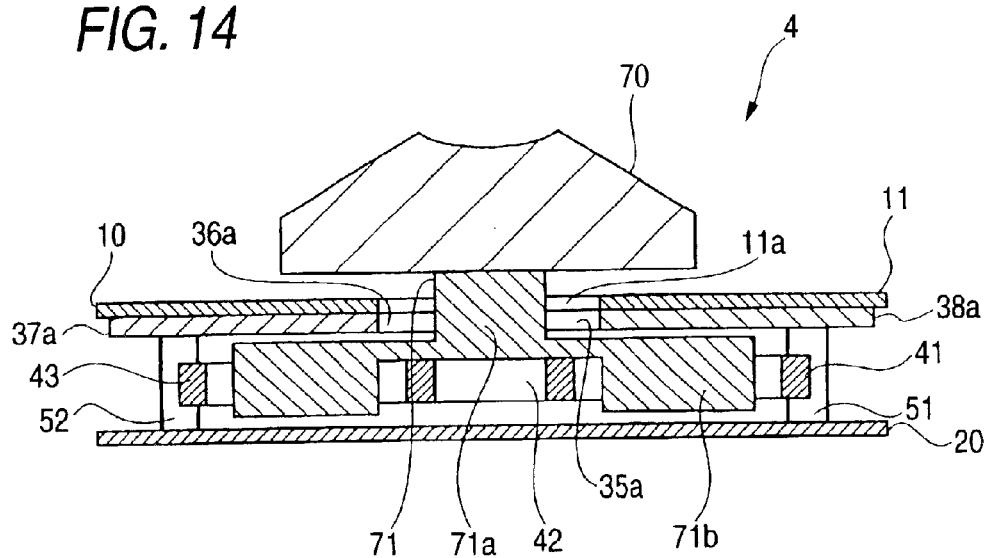
FIG. 14 is a side sectional view of an actuator according to a fourth embodiment taken along the same line I—I as shown in FIG. 1.

An actuator according to a fourth embodiment of the invention will be described below. An actuator 4 according to the fourth embodiment has the same appearance as the actuator 1 of FIG. 1. FIG. 14 is a side sectional view of the actuator 4 taken along the same line I—I as shown in FIG. 1.

Referring to FIG. 14, the actuator 4 is provided with a first yoke plate 11 and a second yoke plate 20 that are made of a magnetic material. The first yoke plate 11 (denoted by reference numeral 10 in the first embodiment) and the second yoke plate 20 have the same relative positional relationship as in the first embodiment. This embodiment is different from the first embodiment in that in this embodiment the first yoke plate 11 has a rectangular opening 11a at the center and the second yoke plate 20 does not have an opening.

The actuator 4 is provided with four coils 41–44 and four magnets 35a–38a. Their structures and the relative positional relationship among them are the same as in the first embodiment and hence will not be described in detail. The actuator 4 is provided with a coil fixing member 71 having coil holder portions 71b to which the coils 41–44 are fixed. The coil holder portions 71b extend from the four ends the coil fixing member 71 toward the second yoke plate 20 and penetrate through the cavities of the respective coils 41–44. And the coils 41–44 are fixed to the respective coil holder portions 71b. The coil fixing member 71 also has a quadratic-prism-shaped pillar portion 71a that projects from the center of coil fixing member 71 and penetrates through the opening 11a of the first yoke plate 11. A haptic feel providing member 70 is fixed to the tip of the pillar portion 71a.

The actuator 4 according to this embodiment provides the following advantages. Since the second yoke plate 20 which is made of a magnetic material is provided approximately parallel with the first yoke plate 11, the thrusts can be increased without increasing the area of the magnets 35a–38a, which in turn makes it possible to actually increase the thrusts on the coils 41–44 and the coil fixing member 71 and to miniaturize the actuator. Since the inclination of the coils 41–44 and the coil fixing member 71 is suppressed, the frictional resistance between the coils 41–44 and the coil fixing member 71 and other members such as the magnets 35a–38a and the second yoke plate 20 is lowered. As a result, the coils 41–44 and the coil fixing member 71 can be moved stably.

In this embodiment, the magnets 35a–38a are attached to the top one of the two yoke plates if the side where the haptic feel providing member 70 exists is defined as the top. In other words, the first yoke plate 11 that is provided with the magnets 35a–38a is located above the second yoke plate 20. The first yoke plate 11 is formed with the opening 11a and the pillar portion 71a penetrates through the opening 11a. In this manner, the actuator may be such that the opening is formed in the first yoke plate. Providing the magnets on the top yoke plate is particularly advantageous in the case where parts that tend to be adversely affected by magnetism such as electronic parts are provided under the actuator. This is because no magnetic flux leaks from the bottom of the actuator and hence the electronic parts or the like receive no adverse effects.

(Fifth Embodiment)

Figure 15:
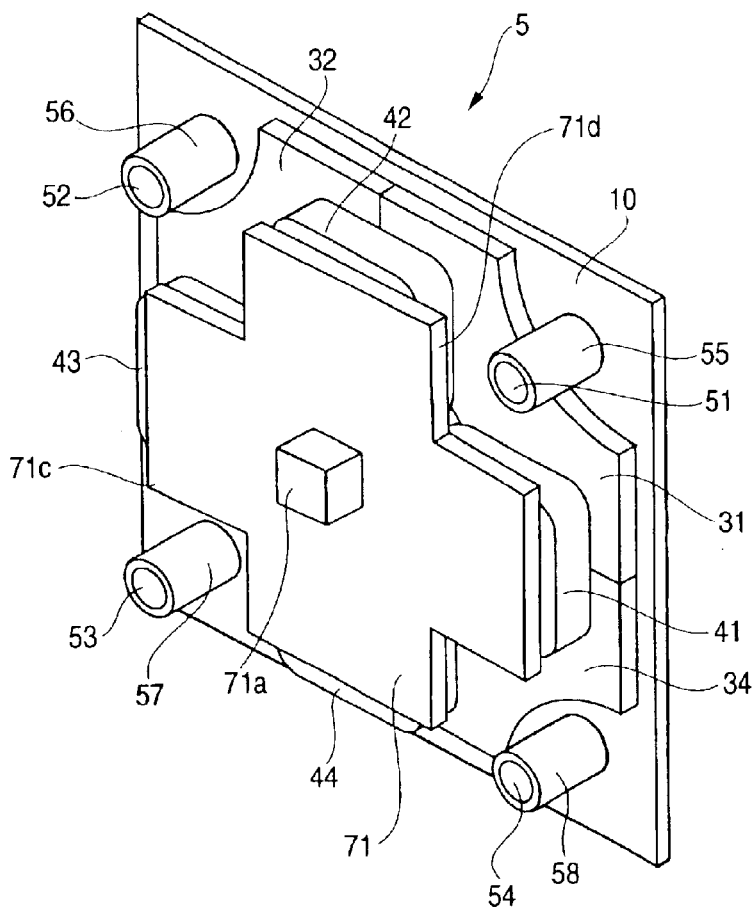
FIG. 15 is a perspective view of an actuator according to a fifth embodiment excluding a haptic feel providing member and a second yoke plate.
Figure 16:
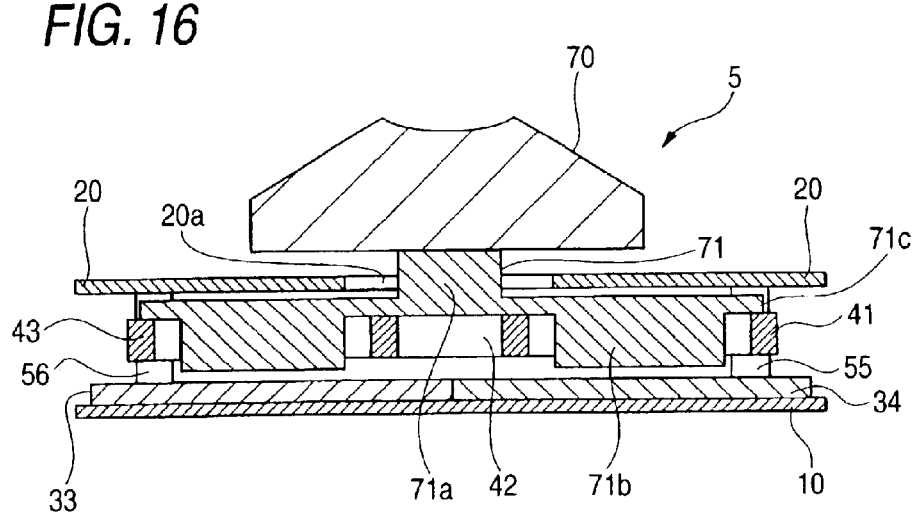
FIG. 16 is a side sectional view of the actuator according to the fifth embodiment taken along the same line I—I as shown in FIG. 1.

An actuator according to a fifth embodiment of the invention will be described below. FIGS. 15 and 16 show the configuration of an actuator 5 according to the fifth embodiment. The actuator 5 has the same appearance as the actuator 1 of FIG. 1. FIG. 15 is a perspective view of the actuator 5 excluding a haptic feel providing member 70 and a second yoke plate 20. FIG. 16 is a side sectional view of the actuator 5 taken along the same line I—I as shown in FIG. 1

Referring to FIGS. 15 and 16, the actuator 5 is provided with a first yoke plate 10, the second yoke plate 20, four magnets 31–34, four coils 41–44, studs 51–54, buffer members 55–58, a haptic feel providing member 70, and a coil fixing member 71. Among the above components, the first yoke plate 10, the second yoke plate 20, the four magnets 31–34, the four coils 41–44, and the haptic feel providing member 70 have the same structures as in the first embodiment and hence will not be described in detail.

This embodiment is different from the above embodiments in the shape of the coil fixing member 71. Specifically, the coil fixing member 71 has a restricting portion 71c that is approximately parallel with the first yoke plate 10 and the second yoke plate 20 and that has a shape as obtained by cutting out four square corner portions from a generally square plate. The surfaces of the restricting portion 71c as appear after cutting out the four corner portions are contact surfaces 71d. The coil fixing portion 71 also has a quadratic-prism-shaped pillar portion 71a that projects from the restricting portion 71c approximately at the center and penetrates through an opening 20a of the second yoke plate 20. The haptic feel providing member 70 is fixed to the tip of the pillar portion 71a so as to be able to move together with the coil fixing member 71, and faces that surface of the second yoke plate 20 which is located on the opposite side to the first yoke plate 10. The coil fixing member 71 further has the coil holder portions 71b that extend from the restricting portion 71c toward the first yoke plate 10 and penetrate through the cavities of the respective coils 41–44. And the coils 41–44 are fixed to the respective coil holder portions 71b.

The studs 51–54 are fixed to the first yoke plate 10 and the second yoke plate 20 at four corner positions. In other words, the studs 51–54 are interposed between and fixed to the first yoke plate 10 and the second yoke plate 20. The studs 51–54 serve to restrict the movable range of the coil fixing member 71. When electromagnetic forces act on the coils 41–44 to move the coil fixing member 71 by a certain distance, a certain contact surface 71d of the restricting portion 71c comes into contact with one of the studs 51–54, whereupon the coil fixing member 71 stops moving. In this manner, the studs 51–54 serve as restricting members for restricting the movable range of the coil fixing member 71.

Buffer members 55–58 are provided so as to cover the circumferential surfaces of the studs 51–54, respectively. Made of a material capable of buffering impact, the buffer members 55–58 reduce impact when contact occurs between the studs 51–54 and the contact surfaces 71d.

The actuator 5 according to this embodiment provides the following advantages. Since the second yoke plate 20 which is made of a magnetic material is provided approximately parallel with the first yoke plate 10, the thrusts can be increased without increasing the area of the magnets 31–34, which in turn makes it possible to actually increase the thrusts on the coils 41–44 and the coil fixing member 71 and to miniaturize the actuator. Since the inclination of the coils 41–44 and the coil fixing member 71 is suppressed, the frictional resistance between the coils 41–44 and the coil fixing member 71 and other members such as the magnets 31–34 and the second yoke plate 20 is lowered. As a result, the coils 41–44 and the coil fixing member 71 can be moved stably.

The actuator may be provided with the restricting members, such as the studs 51–54, that are interposed between and fixed to the first yoke plate 10 and the second yoke plate 20 and restrict the movable range of the coil fixing member 71. Such restricting members provide the same advantages as the opening 20a or 11a of the first to fourth embodiments does. That is, since the movable range of the coils 41–44 and the coil fixing member 71 is restricted, it is not necessary to provide, outside the coil fixing member 71, separate members for restricting the movable range of the coils 41–44 and the coil fixing member 71 and hence the actuator can be miniaturized accordingly.

Part of the coil fixing member 71 may project from a plane that is defined by one sideline of the first yoke plate 10 and the corresponding sideline of the second yoke plate 20 when the coil fixing member 71 has reached an end of the movable range. This makes it possible to increase the movable range of the coil fixing member 71.

As in the case of the actuator 5 according to this embodiment, it is appropriate to provide the buffer members 55–58 on the side surfaces of the respective studs 51–54, that is, those portions of the studs 51–54 which will come into contact with the contact surfaces 71d of the coil fixing member 71. This makes it possible to reduce impact at the time of contact. The same advantage can be obtained also in the case where the studs 51–54 themselves are buffer members. The same advantage can be obtained also in the case where buffer members are provided on the contact surfaces 71 of the coil fixing member 71.

(First Example)

Now, an actuator as a first example according to the invention will be described while being compared with a comparative example. The first example is an implementation of the first embodiment. In the first example, the ratio of the interval $d_1$ between the magnets 31–34 and the coils 41–44 to the interval $d_2$ between the second yoke plate 20 and the coils 41–44 was set such that $d_1:d_2=3:1$. In the comparative example, the ratio $d_1:d_2$ was set to 1:3.

For each of the first example and the comparative example, currents were caused to flow through the respective coils 41–44 so as to generate thrusts that move the coils 41–44 and the coil fixing member 71 in a direction that forms 45° with both of the X-axis and the Y-axis (i.e., the direction from the origin to the stud 51). The magnitudes of the components in the individual directions of a thrust that was generated when the coils 41–44 and the coil fixing member 71 (started at the origin) have reached a fixed position were measured.

In the comparative example, the absolute value of the ratio of the Z component $F_Z$ of a thrust to its X component $F_X$ (i.e., $F_Z/F_X$) was 2.0. In contrast, in the first example, the absolute value of the ratio $F_Z/F_X$ was equal to 1.55.

The comparison between the first example and the comparative example shows that the absolute value of the ratio $F_Z/F_X$ of the first example is smaller than that of the comparative example. That is, the ratios of the Z component of a thrust on the coils 41–44 and the coil fixing member 71 to its X and Y components in the first example are smaller than in the comparative example. As a result, in the first example, the inclination of the coils 41–44 and the coil fixing member 71 with respect to the first yoke plate 10 was smaller, the frictional resistance between the coils 41–44 and the coil fixing member 71 and other members was lower, and it was possible to move the coils 41–44 and the coil fixing member 71 more stably than in the comparative example.

(Second Example)

Next, an actuator as a second example according to the invention will be described. The second example is also an implementation of the first embodiment.

Figure 17:
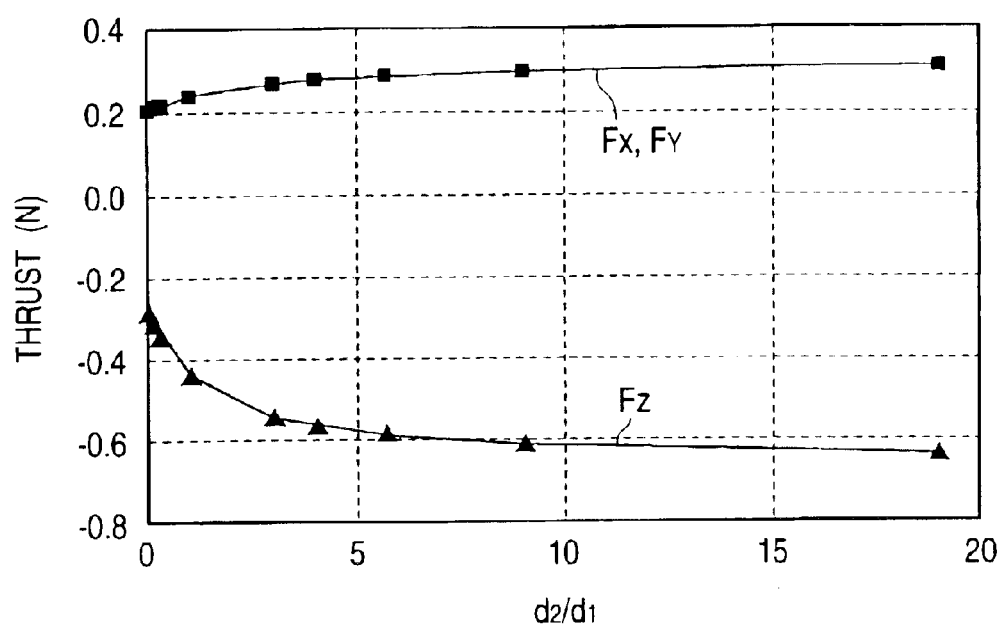
FIG. 17 is a graph showing relationships between the thrust components $F_X$, $F_Y$, and $F_Z$ and the ratio $d_2/d_1$ of the interval $d_2$ with respect to the interval $d_1$ in a second example.

FIG. 17 is a graph showing relationships between the thrust components $F_X$, $F_Y$, and $F_Z$ and the ratio $d_2/d_1$ of the interval $d_2$ with respect to the interval $d_1$. In the second example, the ratio $d_2/d_1$ was varied in a range of approximately 0.5 to 19 and currents were caused to flow though the coils 41–44 so as to generate a thrust for moving the coils 41–44 and the coil fixing member 71 in a direction that forms 450 with both of the X-axis and the Y-axis. The magnitudes of thrust components $F_X$, $F_Y$, and $F_Z$ that were generated when the coils 41–44 and the coil fixing member 71 (started at the origin) have reached a fixed position (in each of the X and Y directions) were measured. As seen from FIG. 17, not only the absolute values of all the thrust components $F_X$, $F_Y$, and $F_Z$ but also the absolute value of the ratio $F_Z/F_X$ decreases as the ratio $d_2/d_1$ becomes smaller. In particular, the absolute value of the ratio $F_Z/F_X$ is sufficiently small in a range where the ratio $d_2/d_1$ is smaller than 1, that is, the interval $d_1$ between the magnets 31–34 and the coils 41–44 is longer than the interval $d_2$ between the second yoke plate 20 and the coils 41–44. This means that setting the interval $d_1$ longer than the interval $d_2$ makes the absolute value of ratio $F_Z/F_X$ sufficiently small and hence can suppress the inclination of the coils 41–44 and the coil fixing member 71 properly. This advantage is remarkable in the case where the coils 41–44 and the coil fixing member 71 are moved relative to the first yoke plate 10 in a wide range in the XY-plane. It is understood that the resistance between the coils 41–44 and the coil fixing member 71 and other components is lowered and hence the coils 41–44 and the coil fixing member 71 can be moved stably.

If priority is given to the magnitudes of the thrusts $F_X$ and $F_Y$, it is effective to increase the ratio $d_2/d_1$. It is particularly effective if the ratio $d_2/d_1$ is larger than 1, that is, the interval $d_1$ between the magnets 31–34 and the coils 41–44 is shorter than or equal to the interval $d_2$ between the second yoke plate 20 and the coils 41–44.

As described above in detail, the invention makes it possible to increase the thrusts of an actuator and to miniaturize its size.

What is claimed is:

1. An actuator comprising:
   a generally flat-plate-like first yoke plate;
   a generally flat-plate-like second yoke plate provided approximately parallel with the first yoke plate;
   a plurality of magnets fixed to a surface of the first yoke plate that is opposed to the second yoke plate;
   a plurality of coils provided parallel with a surface of the second yoke plate that is opposed to the first yoke plate;
   a coil fixing member in the form of a plate having coil holder portions jutting out from an inner portion of the plate and around which the coils are fixed to form a unitary body; and
   an interval between the magnets and the coils is longer than an interval between the second yoke plate and the coils.

2. The actuator according to claim 1, further comprising a restricting member provided in a fixed manner between the first yoke plate and the second yoke plate, for restricting a movable range of the coil fixing member.

3. The actuator according to claim 2, further comprising a buffer member that is provided at a portion of the restricting member to contact the coil fixing member or at a portion of the coil fixing member to contact the restricting member.

4. An actuator comprising:
   a generally flat-plate-like first yoke plate;
   a generally flat-plate-like second yoke plate provided approximately parallel with the first yoke plate;
   a plurality of magnets fixed to a surface of the first yoke plate that is opposed to the second yoke plate;
   a plurality of coils provided parallel with a surface of the second yoke plate that is opposed to the first yoke plate;
   a coil fixing member to which the coils are fixed to form a unitary body; and
   a magnetic member provided adjacent to a boundary of each adjoining pair of magnets among the plurality of magnets.

5. An actuator comprising:
   a generally flat-plate-like first yoke plate;
   a generally flat-plate-like second yoke plate provided approximately parallel with the first yoke plate;
   a plurality of magnets fixed to a surface of the first yoke plate that is opposed to the second yoke plate;
   a plurality of coils provided parallel with a surface of the second yoke plate that is opposed to the first yoke plate;
   a coil fixing member to which the coils are fixed to form a unitary body; and
   wherein one or both of the first yoke plate and the second yoke plate are formed with an opening, and wherein the coil fixing member has a pillar portion that is provided in a region facing the opening so as to penetrate through the opening and whose external size is smaller than an internal size of the opening.

6. The actuator according to claim 5, wherein an interval between the magnets and the coils is shorter than or equal to an interval between the second yoke plate and the coils.

7. The actuator according to claim 5, wherein the second yoke plate is formed with the opening.

8. The actuator according to claim 5, further comprising a buffer member that is provided at an edge of the opening to contact the pillar portion or a portion of the pillar portion to contact the edge of the opening.

9. The actuator according to claim 5, wherein the coil fixing member is formed into a shape that extends in two orthogonal directions.

10. An actuator comprising:
    a generally flat-plate-like first yoke plate;
    a generally flat-plate-like second yoke plate provided approximately parallel with the first yoke plate;
    a plurality of magnets fixed to a surface of the first yoke plate that is opposed to the second yoke plate;
    a plurality of coils provided parallel with a surface of the second yoke plate that is opposed to the first yoke plate;
    a coil fixing member to which the coils are fixed to form a unitary body; and
    wherein the coil fixing member has a pillar portion that is provided on at least one of a side facing the first yoke plate and a side facing the second yoke plate, and wherein the actuator further comprises a surrounding member whose outer size is larger than an outer size of the pillar portion and that is provided so as to surround the pillar portion.

11. The actuator according to claim 10, wherein one or both of the first yoke plate and the second yoke plate are formed with an opening, and wherein the surrounding member is provided adjacent to the opening.

12. The actuator according to claim 10, further comprising a buffer member that is provided at a portion of the surrounding member to contact the pillar portion or a portion of the pillar portion to contact the surrounding member.

13. An actuator comprising:
    a generally flat-plate-like first yoke plate;
    a generally flat-plate-like second yoke plate provided approximately parallel with the first yoke plate;
    a plurality of magnets fixed to a surface of the first yoke plate that is opposed to the second yoke plate;
    a plurality of coils provided parallel with a surface of the second yoke plate that is opposed to the first yoke plate;
    a coil fixing member to which the coils are fixed to form a unitary body; and
    wherein one or both of the first yoke plate and the second yoke plate are formed with an opening, wherein the coil fixing member has a pillar portion that is provided in a region facing the opening so as to penetrate through the opening and whose external size is smaller than an internal size of the opening, and wherein the actuator further comprises a haptic feel providing member that is fixed to the pillar portion so as to be located on a side of the opening opposite to the coil fixing member.

14. An actuator comprising:

a generally flat-plate-like first yoke plate;

a generally flat-plate-like second yoke plate provided approximately parallel with the first yoke plate;

a plurality of magnets fixed to a surface of the first yoke plate that is opposed to the second yoke plate;

a plurality of coils provided parallel with a surface of the second yoke plate that is opposed to the first yoke plate;

a coil fixing member to which the coils are fixed to form a unitary body; and a detecting device to detect a position of the coil fixing member relative to one of the first yoke plate and the second yoke plate.

15. An actuator, comprising:

a generally flat-plate-like first yoke plate;

a generally flat-plate-like second yoke plate provided approximately parallel with the first yoke plate;

a plurality of magnets fixed to a surface of the first yoke plate that is opposed to the second yoke plate;

a plurality of coils provided parallel with a surface of the second yoke plate that is opposed to the first yoke plate; and a coil fixing member in the form of a plate having coil holder portions extending downward from a peripheral portion of the plate and around which the coils are fixed to form a unitary body.

16. An actuator comprising:

a generally flat-plate-like first yoke plate;

a generally flat-plate-like second yoke plate provided approximately parallel with the first yoke plate;

a plurality of magnets fixed to a surface of the first yoke plate that is opposed to the second yoke plate;

a plurality of coils provided parallel with a surface of the second yoke plate that is opposed to the first yoke plate; and a coil fixing member to which the coils are fixed to form a unitary body; and wherein the coil fixing member is movable in a substantially vertical direction.

* * * * *